Sept. 8, 1970        M. SACKIN         3,527,991
SERVOMOTOR CONTROL SYSTEM IN WHICH GAIN IS VARIED IN
RESPONSE TO MOTOR TEMPERATURE
Filed June 27, 1968

WITNESSES:
Leon M. Garman
James F. Young

INVENTOR
Milton Sackin
BY
ATTORNEY

United States Patent Office 3,527,991
Patented Sept. 8, 1970

3,527,991
SERVOMOTOR CONTROL SYSTEM IN WHICH GAIN IS VARIED IN RESPONSE TO MOTOR TEMPERATURE
Milton Sackin, Pittsburgh, Pa., assignor to Westinghouse Electric Corporation, Pittsburgh, Pa., a corporation of Pennsylvania
Filed June 27, 1968, Ser. No. 740,757
Int. Cl. G05b 13/02
U.S. Cl. 318—634                          7 Claims

ABSTRACT OF THE DISCLOSURE

Described is a system for improving the capability of a servomotor in a feedback loop arrangement by sensing the temperature of the motor windings and by reducing the bandwidth or gain of the feedback loop as the temperature rises. In this manner, the maximum capabilities of the system are utilized under all conditions, but not exceeded.

BACKGROUND OF THE INVENTION

Although not limited thereto, the present invention is particularly adapted for use in servo loops or position regulators of the type in which a relatively high load is imposed on a servomotor in the loop. The capabilities of such systems are limited by motor heating; and this is aggravated by repeated accelerations and/or low speed movements. Such movements may be due to bona fide control signals, noise or even loop instability and are magnified by abnormal line voltage.

In the past, overheating protection systems have been provided for servomotors wherein the temperature of the motor windings is sensed and the motor shut down when the temperature reaches a predetermined maximum limit. Such systems, however, suffer from two major drawbacks. In the first place, once power is removed when the predetermined maximum winding temperature is reached, the servomotor can no longer control the position of the device it is intended to control. This can be a serious problem in a process control system such as a furnace control, for example, where the position of a fuel valve, controlled by the servomotor, affects other variables of the system. Failure of one servomotor in such a system will create an abnormal condition which may initiate a chain reaction causing the entire system to be shut down.

Secondly, systems which simply remove power from a servomotor when a maximum winding temperature is reached, do nothing to correct the condition, such as repeated excessive accelerations, which caused the temperature to rise in the first place. That is, they simply permit the abnormal condition which causes overheating to persist until it no longer can be tolerated, whereupon the motor shuts down. As a result of all this, many position servomotor loop systems must be designed with oversized motors.

SUMMARY OF THE INVENTION

As an overall object, the present invention provides an overheating protection system for servomotors wherein the capabilities of the servo loop are reduced as the motor winding temperature increases, thereby counteracting the conditions which cause the heating before the temperature reaches the point where the motor must be shut down.

More specifically, an object of the present invention is to provide an overheating protection system for servomotor loop systems wherein the gain and/or bandwidth of the loop is reduced as motor temperature increases, thereby reducing the capabilities of the system and reducing the possibility of further motor heating.

In the embodiments of the invention shown herein, a servo loop is provided including a servomotor and means for applying a desired position signal to the loop for controlling the rotational position of the motor. Additional means are provided for sensing the angular position of the servomotor, and for producing an actual position signal proportional thereto. The actual and desired position signals are then compared to derive an error signal which is usually applied to the servomotor through amplifiers and a motor control circuit.

In accordance with the present invention, the means for applying the error signal to the servomotor includes apparatus for varying the bandwidth or gain of the servo loop as a function of the temperature of the motor windings. Such apparatus may, for example, comprise an operational amplifier in which one resistance leg of the amplifier comprises a resistance bulb, thermistor or the like device which senses the temperature of the motor windings. A change in resistance of the device will change the loop gain or bandwidth. Another possible arrangement for changing bandwidth incorporates a resistance-capacitance filter wherein the resistance comprises a resistance bulb or thermistor responsive to motor winding temperature such that the bandwidth of the loop is varied as temperature rises.

With the arrangement shown herein, therefore, the bandwidth and/or gain of the loop is reduced as motor temperature rises, thereby counteracting the condition, such as excessive repeated accelerations, which initially caused the heating. Stated in other words, a reduction in gain or bandwidth will reduce the rate of acceleration until the motor windings cool and before the condition reaches the point where the motor must be shut down. This, of course, is in contrast to prior art systems of the type described above wherein the excessive load condition is permitted to continue until it can no longer be tolerated and the motor then must be shut down.

The above and other objects and features of the invention will become apparent from the following detailed description taken in connection with the accompanying drawings which form a part of this specification, and in which.

Figure 1:
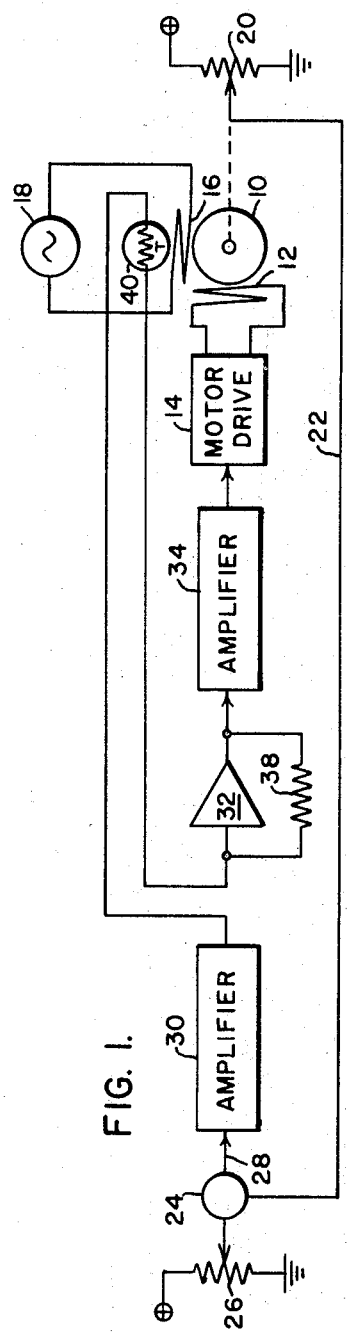
FIG. 1 is a schematic block diagram of one embodiment of the invention.

With reference now to the drawings, and particularly to FIG. 1, a servo loop is provided including a two-phase servomotor 10 having a first winding 12 connected to a motor drive circuit 14 and a second winding 16 connected to a source of alternating current potential 18. The two windings 12 and 16 are disposed at right angles with respect to each other; and the phase of the alternating current power applied to winding 16 from source 18 to 90° out of phase with respect to that applied to winding 12 from motor drive circuit 14. Control of the rotor of the motor 10 is effected in the specific servo loop configuration shown herein by varying the amplitude of the output waveform from motor drive circuit 14. However, it will be understood that the invention can be used with other and different types of servomotors.

Connected to the rotor of motor 10 is a potentiometer-type device 20 which produces a signal on lead 22 which varies as a function of the angular position of the rotor of motor 10. This signal, which may be called an actual position signal, is compared at summing point 24 with a desired position signal from a potentiometer 26. That is, the potentiometer 26 provides a signal proportional to the desired position of the motor rotor. This signal, while shown as being derived from potentiometer 26, may actually be derived from other process variables in a complete control system.

If the desired position signal from potentiometer 26 does not match the actual position signal on feedback path 22, an error or difference signal is developed on lead 28 which is applied through amplifier 30, operational amplifier 32, and amplifier 34 to the motor drive 14. In this manner, the complete servo loop is completed; and, if the desired and actual position signals do not match, the error signal thus produced will cause the motor drive to rotate the rotor of motor 10 until the desired and actual signals are again the same.

As shown, the operational amplifier 32 is provided with a feedback resistor 38 and an input resistance 40 which may comprise a resistance bulb or thermistor in close proximity to the windings 12 and 16 for the motor 10. As the temperature of the motor windings increases, for example, the resistance of resistor 40 will also increase, thereby reducing the gain of the operational amplifier 32 and, hence, the gain of the entire servo loop. Thus, should the loop be subjected to excessive loads, the windings 12 and 16 will heat up, resistance 40 will also heat up and its resistance will increase, thereby reducing the gain of the loop and preventing the excessive loads which initially caused the overheating condition. As the windings cool down, the resistance of resistor 40 will also decrease, thereby increasing the gain of the loop to improve the capabilities of the system.

It can be seen, therefore, that the system of FIG. 1 provides a continual monitoring system which senses temperature and reduces the gain of the servo loop to combat or counteract the condition causing the overheating.

Figure 2:
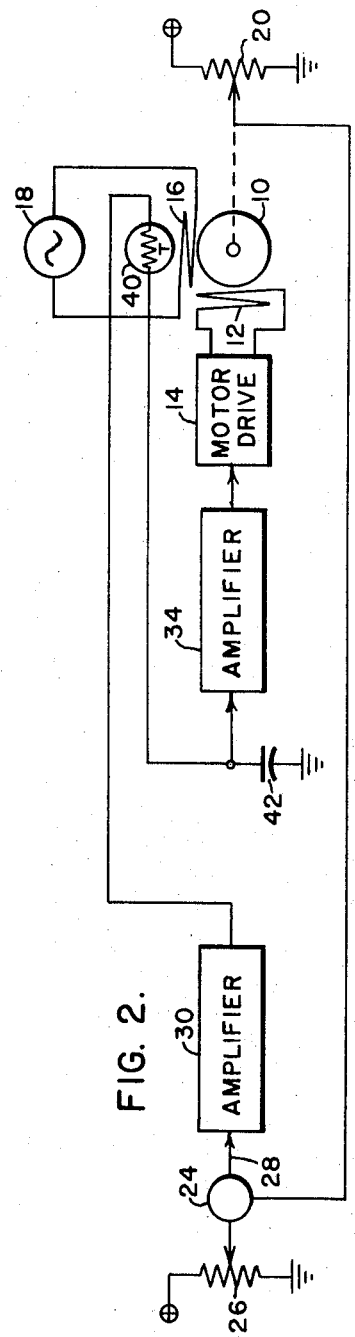
FIG. 2 is a schematic block diagram of another embodiment of the invention.

In FIG. 2, another embodiment of the invention is shown wherein elements corresponding to those of FIG. 1 are identified by like reference numerals. In this case, however, the operational amplifier 32 is replaced by a resistance-capacitance filter in which the resistance element comprises the resistor 40 and the capacitor 42 is connected between one end of the resistor and ground. In this case, as winding temperature increases, the resistance of resistor 40 will again increase, thereby reducing the bandwidth of the servo loop and again counteracting rapid acceleration or other load conditions which have caused the overheating. It will be readily apparent, of course, that combinations of the systems shown in FIGS. 1 and 2 may be provided and that curve shapers of any desired kind may be used between the temperature sensing device and the remainder of the circuitry (e.g., adding the integral function to the same signal).

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a servo loop of the type including a servomotor, means for applying a desired position signal to the loop for controlling the rotational position of the servomotor, means for sensing the angular position of the servomotor and for producing an actual position signal proportional thereto, means for comparing the actual and desired position signals to derive an error signal for the servomotor, and means for applying said error signal to the servomotor; the improvement in said means for applying said error signal to the servomotor comprising means through which said error signal passes for sensing the temperature of the windings of said servomotor, and means responsive to the temperature thus sensed for reducing the capability of the servo loop as the temperature of the windings increases.

2. The improvement of claim 1 wherein the bandwidth of the servo loop is reduced as the temperature of said windings increases.

3. The improvement of claim 1 wherein the gain of said servo loop is reduced as the temperature of said windings increases.

4. The improvement of claim 1 wherein the means for sensing the temperature of the windings of said servomotor comprises a resistance element, the resistance of which increases as temperature increases, said resistance element being in close proximity to said motor windings.

5. The improvement of claim 4 wherein the means for reducing the capability of the servo loop comprises an operational amplifier having a resistance-type feedback network, and means including said resistor in close proximity to said motor windings for applying said error signal to the input of said operational amplifier, the output of the operational amplifier being applied to said servomotor and the gain of the operational amplifier being reduced as the resistance of said resistor increases.

6. The improvement of claim 4 wherein said means for reducing the capability of the servo loop includes a resistance-capacitance filter wherein the resistance of the filter comprises said resistor in close proximity to said servomotor windings.

7. In a control servo loop of the type including an electrical motor, means for applying to said loop a signal which represents a desired operating characteristic of said motor, means coupled to said motor for producing a signal which represents the actual condition of said operating characteristic of the motor, means for comparing the actual and desired signals to derive an error signal for controlling said motor, and means for applying said error signal to the motor; the improvement in said means for applying said error signal to the motor comprising means through which said error signal passes for sensing the temperature of the windings of said motor, and means responsive to the temperature thus sensed for reducing the capability of the servo loop as the temperature of the windings increase.

References Cited

UNITED STATES PATENTS 2,776,397   1/1957   McWilliams.

THOMAS E. LYNCH, Primary Examiner

U.S. Cl. X.R.

318—448, 473